United States Patent
Hawkes et al.

(10) Patent No.: US 7,254,233 B2
(45) Date of Patent: Aug. 7, 2007

(54) FAST ENCRYPTION AND AUTHENTICATION FOR DATA PROCESSING SYSTEMS

(75) Inventors: Philip Michael Hawkes, Burwood (AU); Gregory G. Rose, Concord (AU)

(73) Assignee: QUALCOMM Incorporated, San Diego, CA (US)

( * ) Notice: Subject to any disclaimer, the term of this patent is extended or adjusted under 35 U.S.C. 154(b) by 1023 days.

(21) Appl. No.: 10/205,133

(22) Filed: Jul. 24, 2002

(65) Prior Publication Data

US 2004/0019782 A1 Jan. 29, 2004

(51) Int. Cl.
*H04L 9/00* (2006.01)

(52) U.S. Cl. .......................... 380/37; 380/28; 380/30; 380/42; 380/43; 380/277; 713/168; 713/171

(58) Field of Classification Search ................ 380/28, 380/30, 37, 42, 43, 277; 713/150, 151, 168, 713/171
See application file for complete search history.

(56) References Cited

U.S. PATENT DOCUMENTS

| | | | | |
|---|---|---|---|---|
| 4,918,728 A | * | 4/1990 | Matyas et al. | 380/280 |
| 5,757,913 A | * | 5/1998 | Bellare et al. | 713/168 |
| 6,948,067 B2 | * | 9/2005 | Hawkes et al. | 713/168 |
| 6,950,517 B2 | * | 9/2005 | Hawkes et al. | 380/37 |
| 2001/0046292 A1 | * | 11/2001 | Gligor et al. | 380/37 |
| 2002/0071552 A1 | * | 6/2002 | Rogaway | 380/37 |
| 2002/0191790 A1 | * | 12/2002 | Anand et al. | 380/255 |

OTHER PUBLICATIONS

V. Gligor et al., On Message Integrity in Symmetric Encryption, Nov. 10, 2000, VDG Inc., Chevy Chase Maryland, Nov. 10, 2000.*
P. Rogaway et al., OCB: A Block-Cipher Mode of Operation for Efficient Authenticated Encryption, Department of Computer Science, University of California at Davis, California, USA, Aug. 3, 2001.*
C. Jutla. Encryption Modes with almost free message integrity,. Advances in Cryptology-EUROCRYPT 2001. Lecture Notes in Computer Science, vol. 2045, B. Pfitzmann, ed., Springer-Verlag, 2001.*

* cited by examiner

*Primary Examiner*—Taghi T. Arani
(74) *Attorney, Agent, or Firm*—David J. Huffaker; Sandip Minhas; Thomas Rouse

(57) ABSTRACT

Methods and apparatus are presented for partially encrypting a data transmission, yet providing authentication for all of the data transmission. Plaintext blocks are combined with noise blocks and then either encrypted or decrypted to form ciphertext blocks and authentication blocks. The authentication blocks are used to determine a checksum that is then used to determine an authentication tag.

17 Claims, 6 Drawing Sheets

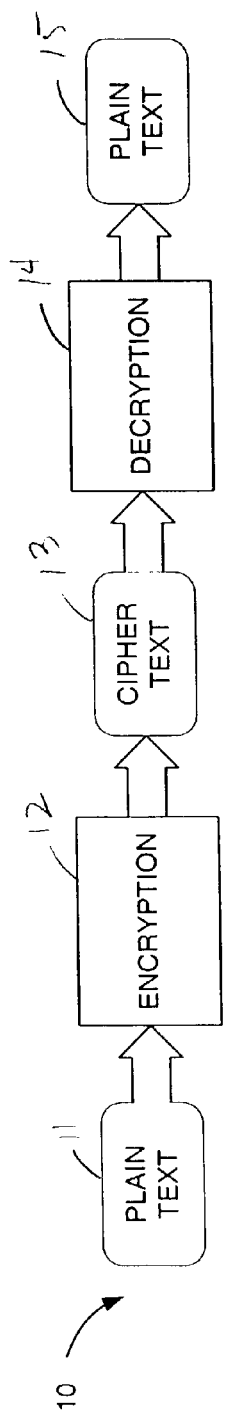
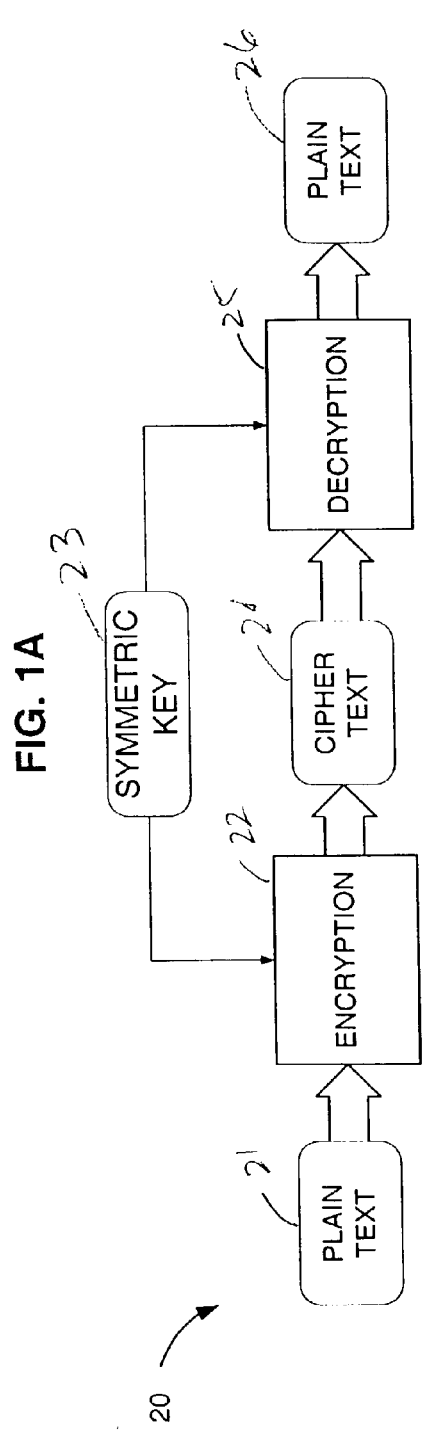
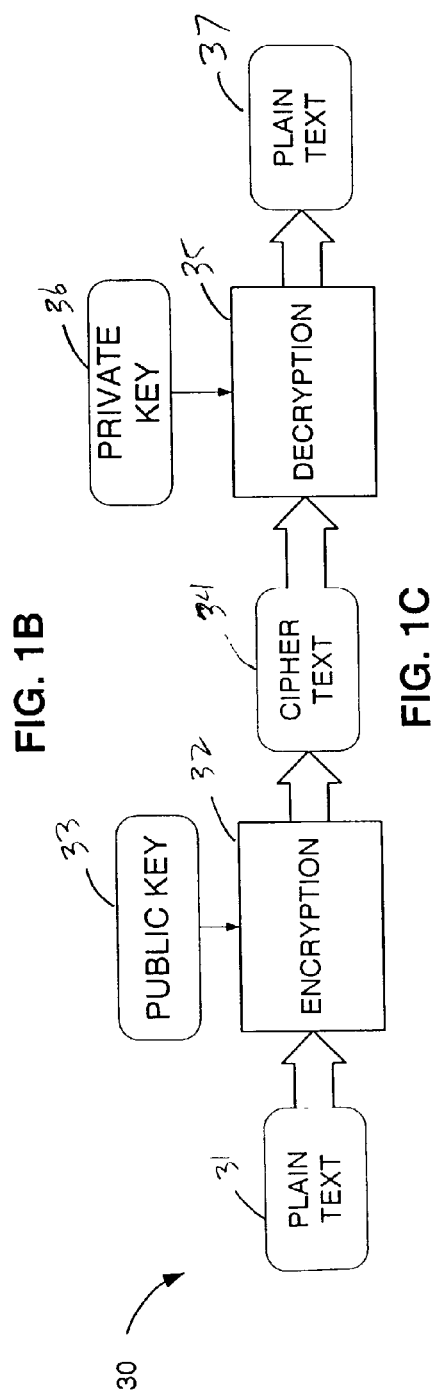
FIG. 1A
FIG. 1B
FIG. 1C

FAST ENCRYPTION AND AUTHENTICATION FOR DATA PROCESSING SYSTEMS

CROSS REFERENCE

This application is related to application Ser. No. 10/205,430 filed Jul. 24, 2002, entitled "Fast Encryption and Authentication for Data Processing Systems"; and U.S. Pat. No. 6,950,517 filed Jul. 24, 2002, entitled "Efficient Encryption and Authentication for Data Processing Systems," and U.S. Pat. No. 6,948,067 filed Jul. 24, 2002, entitled "Efficient Encryption mid Authentication for Data Processing Systems."

BACKGROUND

1. Field

The present invention relates to the field of data processing systems. In particular, to improving security in data processing systems.

2. Background

In a number of diverse fields, such as, e.g., electronic commerce, communications, and broadcasting, security is a major concern. Security measures contribute to accountability, fairness, accuracy, confidentiality, operability, and other criteria that are desired of data processing systems and information systems utilized in these fields. Cryptographic methods that provide such security are usually categorized according to two purposes: encryption and authentication. Encryption is the art of rendering data unreadable by unauthorized parties. Authentication is used to verify the integrity of the data. Verifying the integrity of the data involves verifying the author identity of the data and/or verifying whether the data has been altered.

Encryption systems are often referred to as cryptosystems, and have the property of being either symmetric or asymmetric. A symmetric encryption system uses a secret key to encrypt information and the same secret key to decrypt the encrypted information. An asymmetric encryption system, such as a public key cryptosystem, uses a first key to encrypt information and uses a different key to decrypt the encrypted information.

In many symmetric cryptosystems, one key is used for the encryption and a separate key is used for the authentication. Hence, in data processing systems using a symmetric cryptosystem, encryption and authentication are performed as two separate entities. Since authentication requires approximately as much processing power as encryption, the total amount of processing is equivalent to encrypting the data twice. In data processing systems that operate in a power-limited or hardware-limited environment, such as, e.g., a cellular telephone, personal digital assistant, or other portable communication device, it would be desirable to have a cryptosystem that can perform encryption and authentication as a single entity.

In the papers "Parallelizable Encryption Mode with Almost Free Message Integrity" by Charanjit Jutla and "OCB: A Block-Cipher Mode of Operation for Efficient Authenticated Encryption" by P. Rogaway, cryptosystems were presented that can encrypt messages and authenticate the encrypted messages in a manner that requires little more processing than encryption alone. In other words, encryption and authentication can be performed using a single entity. Hence, the amount of processing resources required to provide security is reduced.

Both cryptosystems require the encryption of all the data that is to be transmitted. However, the requirement that all data of a message must be encrypted is undesirable in certain applications. For example, in communication protocols such as IPSec, encryption of all data is not efficient. A header portion of the data must be sent unencrypted for addressing purposes. The foundations of IPSec are specified in RFC 1825 entitled "Security Architecture for the Internet Protocol," RFC 1826 entitled "IP Authentication Header," and RFC 1827 entitled "IP Encapsulating Security Payload (ESP)," all of which were submitted by R. Atkinson in August, 1995.

Hence, there is a present need for a secure and efficient system for encryption and authentication of data wherein all data bits of a message need not be encrypted.

SUMMARY

Methods and apparatus are presented herein to address the need stated above. Specifically, methods and apparatus are presented for allowing some portion of the data message to be transmitted as plaintext, some portion of the data message to be transmitted as ciphertext, and using a single authentication tag for verifying both the plaintext portion and the ciphertext portion of the data message.

In one aspect, a method is presented for encrypting and authenticating data as a single entity, comprising: forming a plurality of plaintext blocks from the data; specifying at least one cleartext position; determining a plurality of noise blocks using a nonce value; determining a first plurality of ciphertext blocks and a first plurality of authentication blocks associated with the at least one cleartext position, wherein each of the first plurality of ciphertext blocks is formed by setting a corresponding ciphertext block equal to a corresponding one of the first plurality of plaintext blocks, and each of the first plurality of authentication blocks is formed by: combining a plaintext block with a corresponding noise block to form a corresponding intermediate ciphertext block; decrypting the corresponding intermediate ciphertext block into a corresponding intermediate plaintext block; and combining the corresponding intermediate plaintext block with the corresponding noise block to form an authentication block; determining a second plurality of ciphertext blocks and a second plurality of authentication blocks not associated with the at least one cleartext position, wherein each of the second plurality of authentication blocks is equal to a corresponding plaintext block, and each of the second plurality of ciphertext blocks is formed by: combining a plaintext block with a corresponding noise block to form a corresponding intermediate plaintext block; encrypting the corresponding intermediate plaintext block into a corresponding intermediate ciphertext block; combining the corresponding intermediate ciphertext block with the corresponding noise block to form a ciphertext block; computing a checksum value based on the first plurality of authentication blocks and second plurality of authentication blocks; computing an authentication tag by combining the checksum value with a noise block, encrypting the combined checksum value and combining the encrypted checksum value with another noise block; and appending the authentication tag to a plurality of transmission blocks, wherein the transmission blocks comprise the first plurality of ciphertext blocks and the second plurality of ciphertext blocks.

In another aspect, a method is presented for decrypting and verifying a plurality of transmission blocks accompanied by an authentication tag, comprising: determining a plurality of noise blocks using a nonce value and a first key;

determining a plurality of authentication blocks by: combining a corresponding transmission block with a corresponding noise block to form a corresponding intermediate ciphertext block; decrypting the corresponding intermediate ciphertext block into a corresponding intermediate plaintext block using a second key; and combining a corresponding intermediate plaintext block with the corresponding noise block to form a corresponding authentication block; determining a first plurality of plaintext blocks corresponding to at least one cleartext position, wherein each of the first plurality of plaintext blocks is set equal to a corresponding transmission block; determining a second plurality of plaintext blocks, wherein each of the second plurality of plaintext blocks do not correspond to the at least one cleartext position and is set equal to a corresponding authentication block; computing a checksum value based on the plurality of authentication blocks; and verifying the authentication tag.

In another aspect, a method is presented for generating secure data transmissions, wherein a first portion of the data transmission is sent as plaintext, a second portion of the data transmission is sent as ciphertext, and all of the data transmission is authenticated, the method comprising: generating a set of cleartext positions; forming a plurality of authentication blocks based on decrypting the first portion of the data transmission; forming a plurality of ciphertext blocks based on encrypting the second portion of the data transmission; forming a checksum based on the plurality of authentication blocks; and forming an authentication tag based on the checksum, wherein the first portion of the data transmission, the plurality of ciphertext blocks, and the authentication tag are for transmission.

In another aspect an apparatus is presented for generating secure data transmissions, wherein a first portion of the data transmission is sent as plaintext, a second portion of the data transmission is sent as ciphertext, and all of the data transmission is authenticated, the apparatus comprising: means for generating a set of cleartext positions; means for forming a plurality of authentication blocks based on decrypting the first portion of the data transmission; means for forming a plurality of ciphertext blocks based on encrypting the second portion of the data transmission; means for forming a checksum based on the plurality of authentication blocks; and means for forming an authentication tag based on the checksum, wherein the first portion of the data transmission, the plurality of ciphertext blocks, and the authentication tag are for transmission.

BRIEF DESCRIPTION OF THE DRAWINGS

FIGS. 1A, 1B, and 1C are block diagrams of a basic cryptosystem, a symmetric encryption system, and an asymmetric encryption system respectively.

DETAILED DESCRIPTION

Figure 2A:
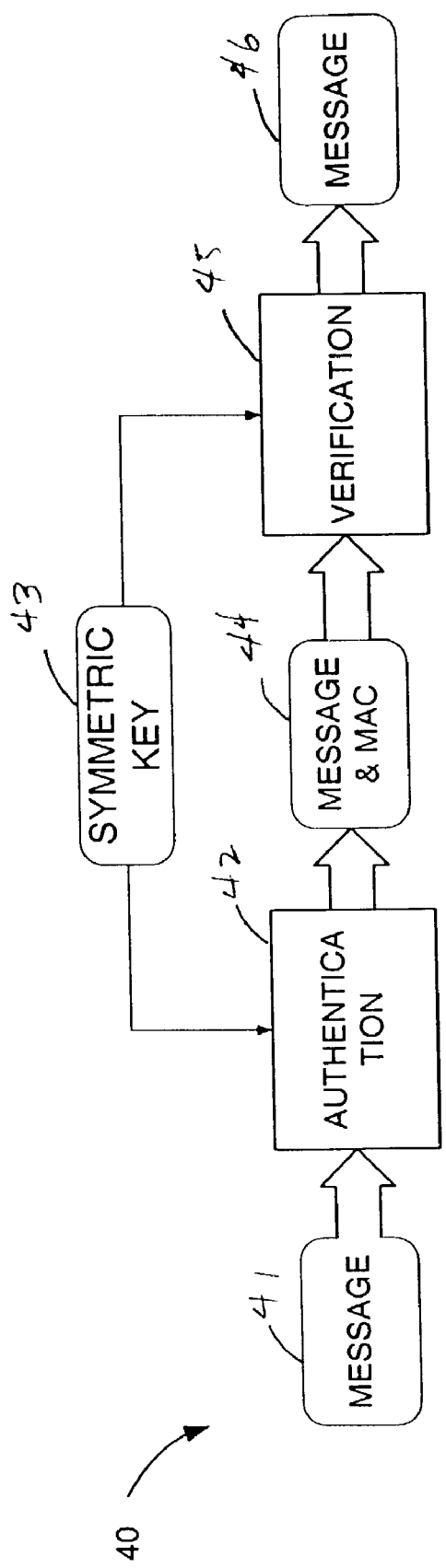
FIGS. 2A and 2B are block diagrams of a symmetric authentication system, and an asymmetric authentication system, respectively.

Encryption renders data unreadable by unauthorized parties. The original data message is referred to as a plaintext message or plaintext. The encrypted message is called a ciphertext, wherein encryption includes any means to convert plaintext into ciphertext. Decryption includes any means to convert ciphertext into plaintext, i.e., to recover the original message. FIG. 1A illustrates a basic cryptosystem 10 designed for encryption. The plaintext message 11 is operated upon by an encryption scheme 12 to form ciphertext 13. The ciphertext 13 is then transmitted through a communication channel (not shown) and undergoes a decryption scheme 14 at another site (not shown) to recover the plaintext 15. Plaintext and ciphertext can refer to any data, including audio and video data presented in digital form.

Cryptanalysis is the art of circumventing the security of cryptosystems. The entity performing the cryptanalysis is known in the art as an adversary or attacker. A cryptanalysis of an encryption scheme is directed towards decrypting an unauthorized message. A cryptanalysis of an authentication scheme is directed towards the composition of a message that can be verified as being sent by someone else.

A cryptosystem is based on secrets. A group of entities shares a secret if an entity outside this group cannot obtain the secret without expending a significantly large amount of resources. This secret is said to serve as a security association within the group of entities.

Typically, the secret comprises a key or a set of keys, which are measured in bits. The longer the key, the more cryptically secure the key will be. A symmetric cryptosystem uses the same secret key to encrypt a message as to decrypt a message. A symmetric encryption system 20 is illustrated in FIG. 1B, wherein both the encryption and decryption utilize a same private key. Plaintext 21 is operated upon by an encryption scheme 22. A secret key 23 is used in the encryption scheme 22 to form ciphertext 24. Cipher text 24 is transmitted over a communication channel (not shown) to another site wherein a decryption scheme 25 uses the same secret key 23 to form the plaintext 26.

In contrast, an asymmetric cryptosystem uses a first key to encrypt a message and uses a different key to decrypt it. FIG. 1C illustrates an asymmetric encryption system known as a public key cryptosystem 30, wherein a public key is provided for encryption and a private key is provided for decryption. The public key is published, so that any party can use the public key to encrypt any message. However, only the privately held, unpublished key may be used to decrypt the message encrypted with the public key. Plaintext 31 is input into an encryption scheme 32, which uses a public key 33 that is associated with a designated party and obtained from a publication. The resulting ciphertext 34 is transmitted over a communication channel (not shown) to the designated party. The designated party uses a private key 36 in a decryption scheme 35 to convert the ciphertext 34 into plaintext 37.

Symmetric encryption is generally much faster than asymmetric encryption. However, transfer of the secret key from a sender to a recipient is problematic due to the possibility of interception by an adversary. One solution is to use a trusted third party to hold the keys, who will share a key only with an authorized party. The embodiments described herein do not address this problem, and assumes that the sender and receiver share a secret key.

The integrity of the ciphertext generated by the above cryptosystems is typically provided by appending some authenticating data to the transmitted ciphertext. The authenticating data is usually computed as a function of the message content and a secret integrity key.

In a symmetric authentication system, the authenticating data is known as a Message Authentication Code (MAC). The MAC is computed as a function of both the message content and a secret integrity key, wherein both the sender and the designated target share the secret integrity key. The sender transmits the message and appends the MAC. The message can be either plaintext or ciphertext. The receiver re-computes the MAC from the message and accepts the integrity of the message only if the re-computed MAC agrees with the transmitted MAC. Theoretically, only the sender of the message could generate a valid signature for that message, thereby authenticating the message for the receiver.

A symmetric authentication system 40 is illustrated in FIG. 2A, wherein both the signing and verification utilize a same private key. The message 41 is operated upon by an authentication scheme 42 that uses a key 43 to form authenticating data 44. The authenticating data 44 and the message 41 are then transmitted through a communication channel (not shown) to another party (not shown). The message 41 is operated upon a verification scheme 45 using a same key 43 to determine authenticating data 46. The authenticating data 46 that is generated by the receiving party is compared to the authenticating data 44 that is received over the communication channel.

Figure 2B:
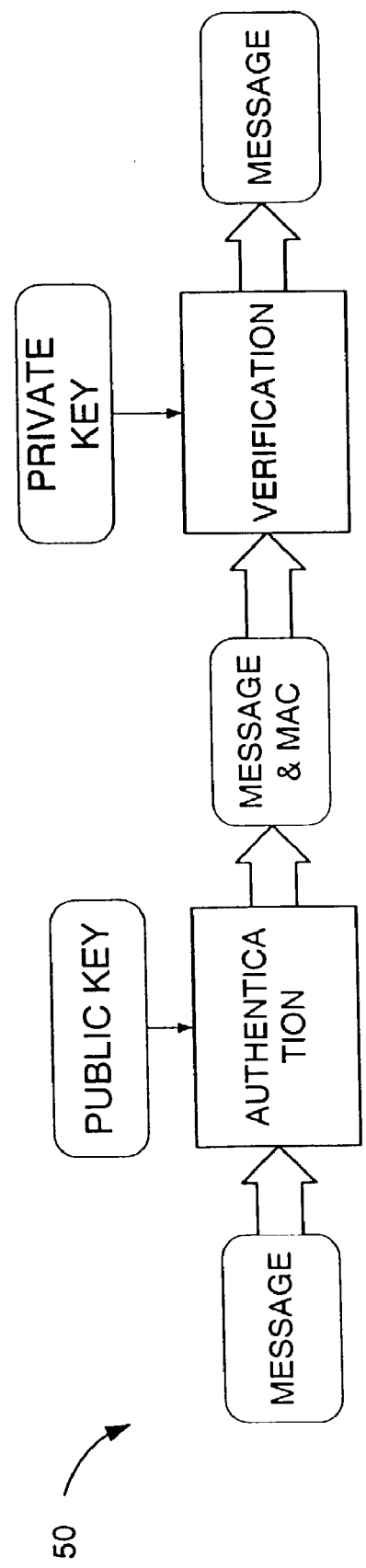

In an asymmetric authentication system, the authenticating data is known as a digital signature. The digital signature is computed as a function of the message content and a private integrity key of the sender. The sender transmits the digital signature to a receiving party, who then performs a verification upon the digital signature using a public key of the sender. An asymmetric authentication system 50 is illustrated in FIG. 2B, wherein the signing utilizes a private key and the verification utilizes the corresponding public key.

In some schemes, the MAC or digital signature is computed from a 'message digest' that contains a unique mathematical description of a secret message. The message digest is smaller in length than the original message, so that computations upon the message digest are more easily performed. Dependence of the MAC or digital signature upon a secret message or upon a message digest ensures that the authenticating data does not remain constant, since the secret message or message digest does not remain constant. If the authenticating data does remain constant across multiple messages, then an adversary could easily appropriate the authenticating data falsely.

The message digest is often computed using a cryptographic hash function. A cryptographic hash function computes a value (comprising a fixed number of bits) from any input, regardless of the length of the input. One property of a cryptographic hash function is that given an output value, it is computationally difficult to determine an input that will result in that output. An example of a cryptographic hash function is SHA-1, as described in "Secure Hash Standard," FIPS PUB 180-1, promulgated by the Federal Information Processing Standards Publications (FIPS PUBS) and issued by the National Institute of Standards and Technology (NIST).

A block cipher is a symmetric encryption scheme for which the input to the scheme is always a fixed length in bits. The length is known as the block size of the block cipher. An example of a block cipher is the Data Encryption Standard (DES) as described in "Data Encryption Standard", FIPS PUB 46-1 promulgated by the FIPS PUBS and issued by the NIST. DES has a block size of 64-bits. Another example of a block cipher is the Advanced Encryption Standard (AES) as described in "Advanced Encryption Standard", FIPS PUB 197 promulgated by the FIPS PUBS and issued by the NIST. AES has a block size of 128-bits.

The key length of a block cipher is the length of the key in bits. However, the entropy of a key is the logarithm (base 2) of the number of possible values for the key. The entropy is also written in terms of bits. For example, the DES has a 64-bit key, with 8 of these bits used as checksums to detect errors in key transmission. Consequently, the key-entropy of DES is $(64-8)=56$ bits.

Given several pairs of inputs and corresponding outputs of a block cipher, the block cipher key can be derived by an adversary who tests all possible key values in order to determine which inputs result in the correct outputs. This type of attack is known as an exhaustive key search. The computational complexity of this attack is the number of encryption operations required for the attack. Hence, an attack for extracting a k-bit key requires approximately $2^k$ encryption operations to extract the block cipher key in an exhaustive key search.

Block ciphers are useful for constructing other cryptographic entities. The way in which a block cipher is used is called a mode of operation. Four modes of operation for DES have been standardized and are described in "DES Modes of Operation", FIPS PUB 81, promulgated by the FIPS PUBS and issued by the NIST. These four modes are Electronic Codebook (EBC), Cipher Bock Chaining (CBC), Output Feedback (OFB) and Cipher Feedback (CFB). For illustrative purposes, only ECB and CBC are discussed herein to encrypt a sequence of plaintext blocks $P_1, \ldots,$ and $P_m$.

In ECB mode, the block cipher is used to encrypt each block of plaintext into a block of ciphertext according to the following relation:

$$C_i = E_K(P_i),$$

where $E_K(P_i)$ denotes the encryption of the block $P_i$ using the key K. As used herein, the term $D_K(P_i)$ denotes the decryption of block $P_i$ using the key K.

In CBC mode, the first plaintext block is XORed with a secret initial value (IV) to form a result that is then encrypted. A mathematical description of this process is written in accordance with the relation:

$$C_1 = E_K(P_1 \oplus IV).$$

Thereafter, each plaintext block is XORed with the previous ciphertext prior to encryption as follows:

$$C_i = E_K(P_i \oplus C_{i-1}).$$

Efficient encryption and authentication can be problematic in symmetric cryptosystems. Until recently, the only solution to satisfy this requirement was to use a naive approach: provide encryption and authentication as two separate functions. The two functions require approximately equal amounts of computation, so using both functions is twice as expensive as using only one or the other.

Figure 3:
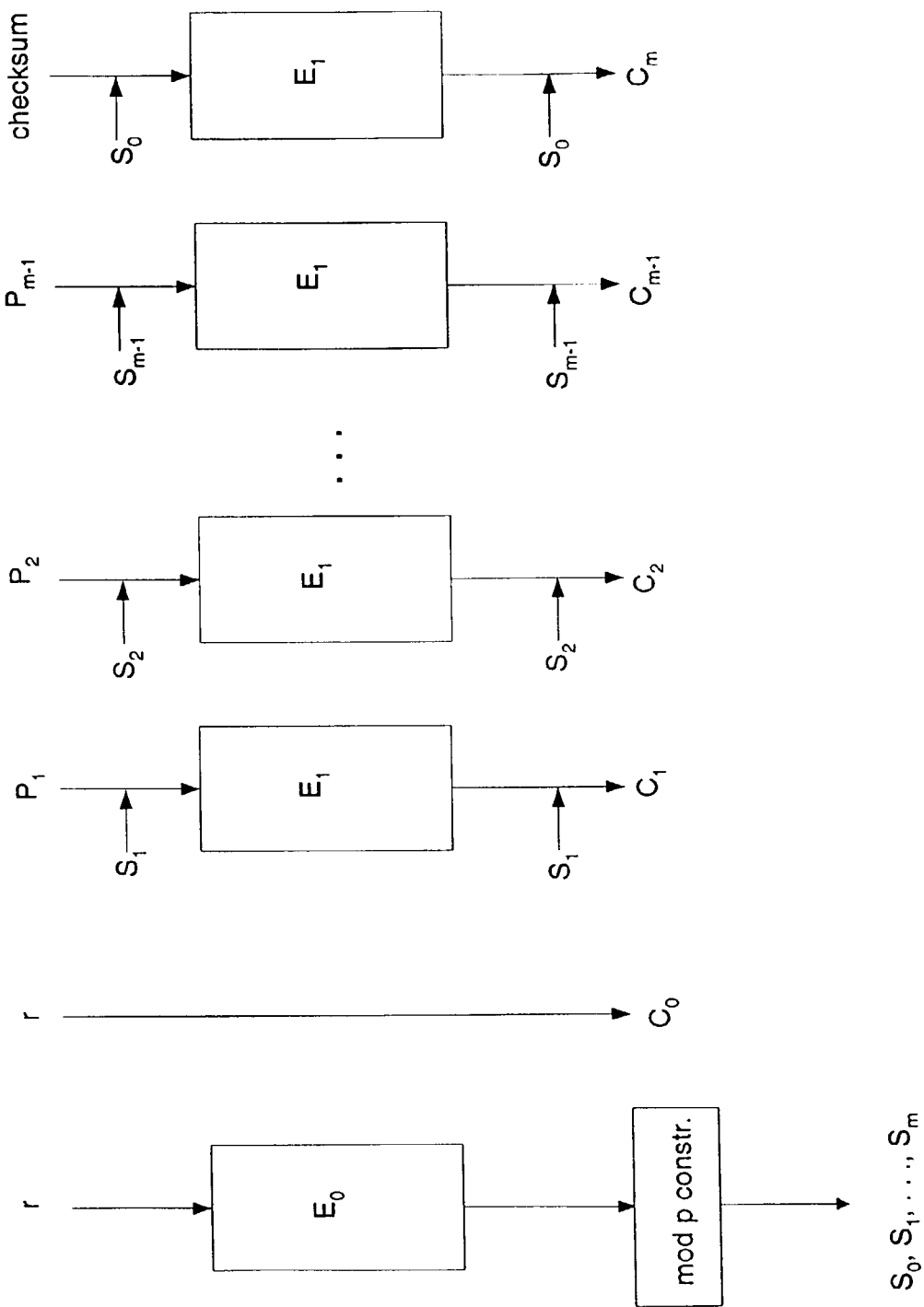
FIG. 3 is a block diagram of the Integrity Aware Parallelizable Mode (IAPM).

In the papers, "Parallelizable Encryption Mode with Almost Free Message Integrity" and "Encryption Modes with Almost Free Message Integrity," Jutla proposed two methods that provide encryption and authentication requiring only slightly more computations than either encryption or authentication alone. These methods are of a general form and employ a block cipher as a cryptographic kernel. In the cryptographic community, such a method is also called a "mode of operation." One of Jutla's mode of operations, known as Integrity Aware Parallelizable Mode (IAPM) with only XOR operations, is shown in FIG. 3. IAPM uses two keys: $K_0$ and $K_1$. Suppose a sender wishes to encrypt and authenticate a message consisting of (m−1) message blocks $P_1$ through to $P_{m-1}$. The sender chooses a random value r that is placed in ciphertext block $C_0$. The value of r is encrypted to form value a using the key $K_0$. The value a is then used to derive pair-wise independent values $S_0$ through to $S_m$. $S_0, \ldots, S_m$ are pair-wise independent if $S_0, \ldots, S_m$ are uniformly distributed n-bit random numbers with the property that for every pair $S_i$ and $S_j$, where $i \neq j$, and every pair of n bit constants $c_1$ and $c_2$, the probability that $S_i = c_1$ and $S_j = c_2$ is $2^{-2n}$. The actual computation of $S_0$ through to $S_m$ is not relevant to the understanding of IAPM and will not be described herein. Hereinafter, these pair-wise independent values will be referred to as "noise blocks." The values of the ciphertext blocks $C_1$ through to $C_{m-1}$, are derived as:

$$C_1 = E_{K1}(P_1 \oplus S_1) \oplus S_1,$$

$$C_2 = E_{K1}(P_2 \oplus S_2) \oplus S_2,$$

$$C_{m-1} = E_{K1}(P_{m-1} \oplus S_{m-1}) \oplus S_{m-1},$$

wherein the key $K_1$ is used for each ciphertext block. The sender then computes a checksum value CHK, which is defined by:

$$CHK = P_1 \oplus P_2 \oplus \ldots \oplus P_{m-1} \oplus S_m.$$

A MAC tag $C_m$ is computed from CHK by encrypting with key $K_1$ and XORing $S_0$:

$$C_m = E_{K1}(CHK) \oplus S_0.$$

The sender transmits $C_0 \ldots C_m$.

Suppose a receiver receives $C'_0 \ldots C'_m$. The receiver begins the decryption process by first encrypting $r' = C'_0$ to form a', using the key $K_0$. The receiver then computes the values of $S'_0$ through to $S'_m$. The values of the plaintext blocks $P'_1$ through to $P'_{m-1}$, where $1 \leq i \leq m$, are derived as:

$$P'_1 = D_{K1}(C'_1 \oplus S'_1) \oplus S'_1,$$

$$P'_2 = D_{K1}(C'_2 \oplus S'_2) \oplus S'_2,$$

$$P'_{m-1} = D_{K1}(C'_{m-1} \oplus S'_{m-1}) \oplus S'_{m-1},$$

wherein the key $K_1$ is used for each plaintext block, and $D_K(C_i)$ denotes the decryption of the block $C_i$ using the key K. The receiver then computes a checksum value CHK' 338 defined by:

$$CHK' = P'_1 \oplus P'_2 \oplus \ldots \oplus P'_{m-1} \oplus S'_{m-1}.$$

A value X is computed by encrypting CHK' with key $K_1$, and then XORing the encrypted result with $S'_0$. Mathematically, the process can be described as follows:

$$X = E_{K1}(CHK') \oplus S'_0.$$

If X and $C'_m$ are equal, then the receiver can be sure of the integrity of the encrypted message.

Rogaway, in the paper, "OCB: A Block-Cipher Mode of Operation of Efficient Authenticated Encryption," proposed a similar mode called Offset Codebook mode (OCB mode) that provides encryption and authentication using a similar amount of computation. OCB is similar to IAPM when generating most of the ciphertext blocks, except for the last ciphertext block $C_{m-1}$. In particular, OCB allow the last plaintext block $P_{m-1}$ to have a length that is less than the block size of the block cipher, but OCB encrypts the last plaintext block into a ciphertext block that is the same size as the other ciphertext blocks. OCB differs from IAPM by the number of noise blocks needed and the method used to generate the noise blocks.

In the case where the last plaintext block does not have the same length as the block size of the block cipher, OCB performs the following steps to mitigate the size difference.

First, extract a length of the last plaintext block $P_{m-1}$, wherein the length is an integer value. Express the integer value as a first intermediate block L. Combine the first intermediate block with the corresponding noise block $S_{m-1}$ to form a second intermediate block A. Encrypt the second intermediate block A to form a third intermediate block B. Form a fourth intermediate block D by truncating the third intermediate block B to the length of the last plaintext block $P_{m-1}$. Combine the fourth intermediate block D to the last plaintext block $P_{m-1}$ to form the last ciphertext block $C_{m-1}$. The block $C_{m-1}$ will have the same length as the last plaintext block. In forming the checksum, the sender then computes:

$$P_m = P_1 \oplus P_2 \oplus \ldots \oplus P_{m-2} \oplus P^*_{m-1},$$

wherein $P^*_{m-1} = (0^* \| C_{m-1}) \oplus B_{m-1}$, given that $(0^* \| C_{m-1})$ denotes the block with the least significant bits equal to $C_{m-1}$ and the remaining most significant bits set to zero.

The above modes of operation have certain undesirable properties. The first undesirable property is that these modes require all of the data to be sent encrypted. In Internet protocols such as IPSec, it is not desirable to transmit messages where all the data is encrypted. In particular, headers containing addressing information must be sent in the clear. The embodiments described herein propose a variant of the IAPM and OCB modes (hereafter called the Partial Encryption with Message Integrity mode: PEMI mode) that allows blocks of the data to be sent as plaintext, while adding only a small amount of processing.

It should be noted that either hardware or software in data or communication systems could be configured to perform the different embodiments of the PEMI mode. Hardware may include, but are not limited to, processing elements that implement a set of instructions stored on a computer-readable medium, e.g., memory, to perform the encryption, authentication, decryption, and verification processes that are described herein. Moveover, the various combination steps are described using the bit-wise, logical exclusive-or operator. Other implementations of the embodiments can be performed by using modular integer addition operations, wherein two inputs are treated as binary representations of integers, an intermediate value is formed as the binary representation as the sum of the integers, and the output is formed by truncating the intermediate value to the cipher block size. Other group operators can be also be used with the appropriate modifications, however, for the purpose of illustrative ease, only the embodiments using XOR operators are described herein.

Figure 4:
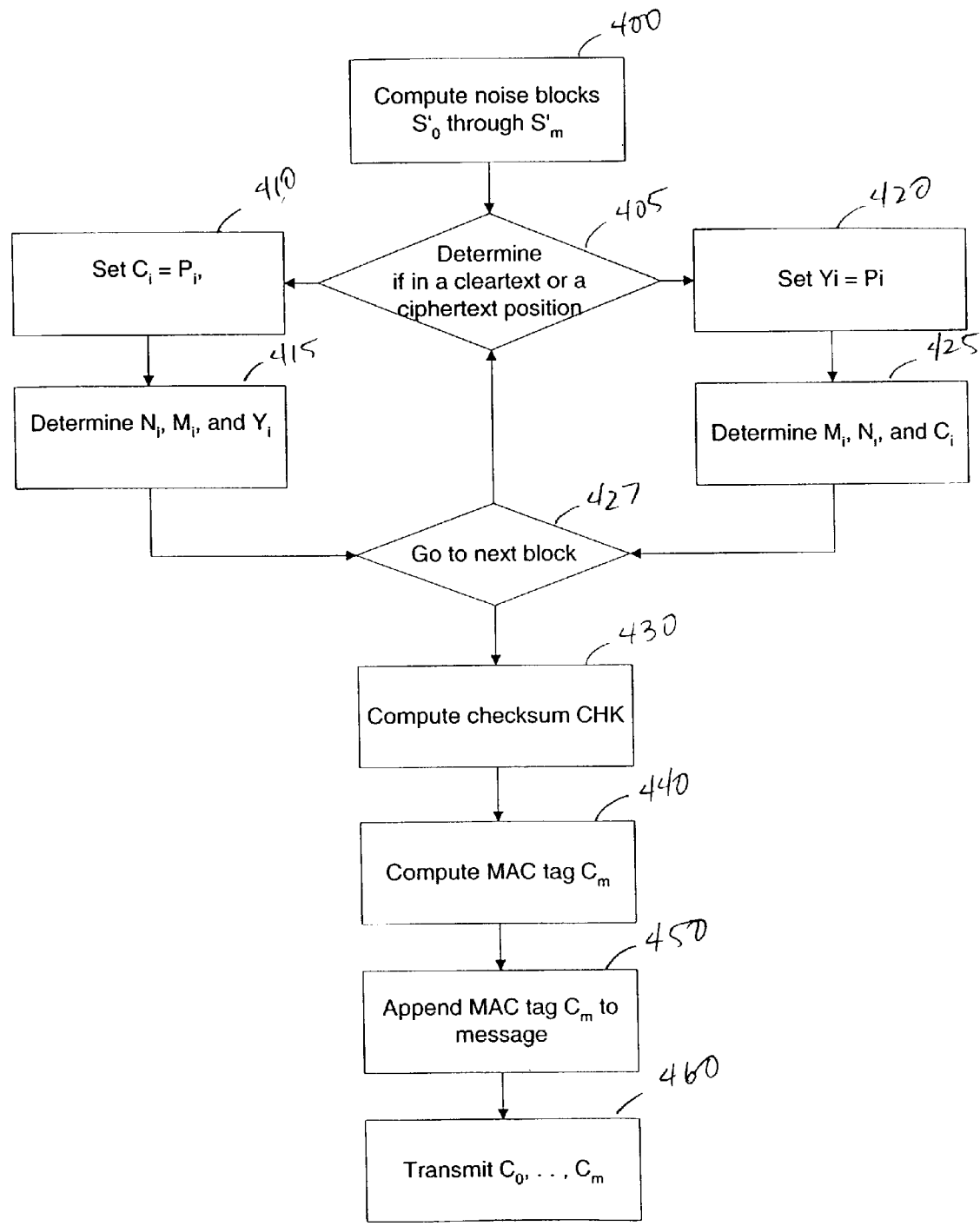
FIG. 4 is a block diagram of the Partial Encryption with Message Integrity (PEMI) Mode.

An embodiment of the PEMI mode is illustrated in FIG. 4. The PEMI mode of operation uses two keys: $K_0$ and $K_1$. Suppose a sender wishes to encrypt and authenticate a message consisting of (m−1) message blocks $P_1$ through to $P_{m-1}$. The sender and receiver agree on the set of plaintext blocks to be sent in unencrypted form. Let U denote the set of indices of the plaintext blocks to be sent in un-encrypted form, wherein the elements of U are referred to as cleartext blocks.

At step 400, the sender chooses r and follows the IAPM mode to compute $S_0$ through to $S_m$. In an alternative embodiment, the sender follows the OBC mode to compute the noise blocks. However, for illustrative ease, the embodiments are described in relation to the IAPM mode. At step 405, a a decision as to whether i∈U, where $1 \leq i \leq m$. If i∈U, the program flow proceeds to step 410. If i∉U, the program flow proceeds to step 420.

If i∈U, then at step 410, the sender generates ciphertext blocks ($C_1, \ldots, C_{m-1}$) by setting $C_i = P_i$. At step 415, intermediate ciphertext blocks ($N_1, \ldots, N_{m-1}$), intermediate plaintext blocks ($M_1, \ldots, M_{m-1}$), and authentication blocks ($Y_1, \ldots, Y_{m-1}$) are generated from plaintext blocks ($P_1, \ldots, P_{m-1}$) in accordance to the relations:

$$N_i = P_i \oplus S_i,$$

$$M_i = D_{K1}(N_i),$$

$$Y_i = S_i \oplus M_i;$$

The program flow then proceeds to step 427.

If i∉U, then at step 420, the sender generates the authentication blocks by setting $Y_i = P_i$. At step 425, the ciphertext blocks, intermediate ciphertext blocks, intermediate plaintext blocks and authentication blocks are generated in accordance to the relations:

$$M_i = P_i \oplus S_i,$$

$$N_i = E_{K1}(M_i),$$

$$C_i = S_i \oplus N_i.$$

The program flow then proceeds to step 427.

At step 427, the index i is incremented, i.e., the next block will be processed. If another block is to be processed, then the program flow returns to step 405. If no more blocks need to be processed, then the program flow proceeds to step 430.

At step 430, the sender computes a checksum CHK as $$CHK = Y_1 \oplus \ldots \oplus Y_{m-1}.$$

At step 440, the sender computes a MAC tag $C_m$ using the following relationships:

$$M_m = CHK \oplus S_m,$$

$$N_m = E_{K1}(M_m),$$

$$C_m = S_0 \oplus N_m.$$

At step 450, the sender appends the MAC tag $C_m$ to the message: the entire ciphertext to be transmitted is ($C_0, \ldots, C_m$) at step 460.

In an alternate embodiment that increases the speed at which encryption and authentication functions are performed, each plaintext block is processed in parallel with each other or a plurality of plaintext blocks are performed in parallel with another plurality of plaintext blocks. This parallel processing can be implemented by altering the index incrementing of step 425 and by performing steps 405, 410 and 420 for each plaintext block.

Figure 5:
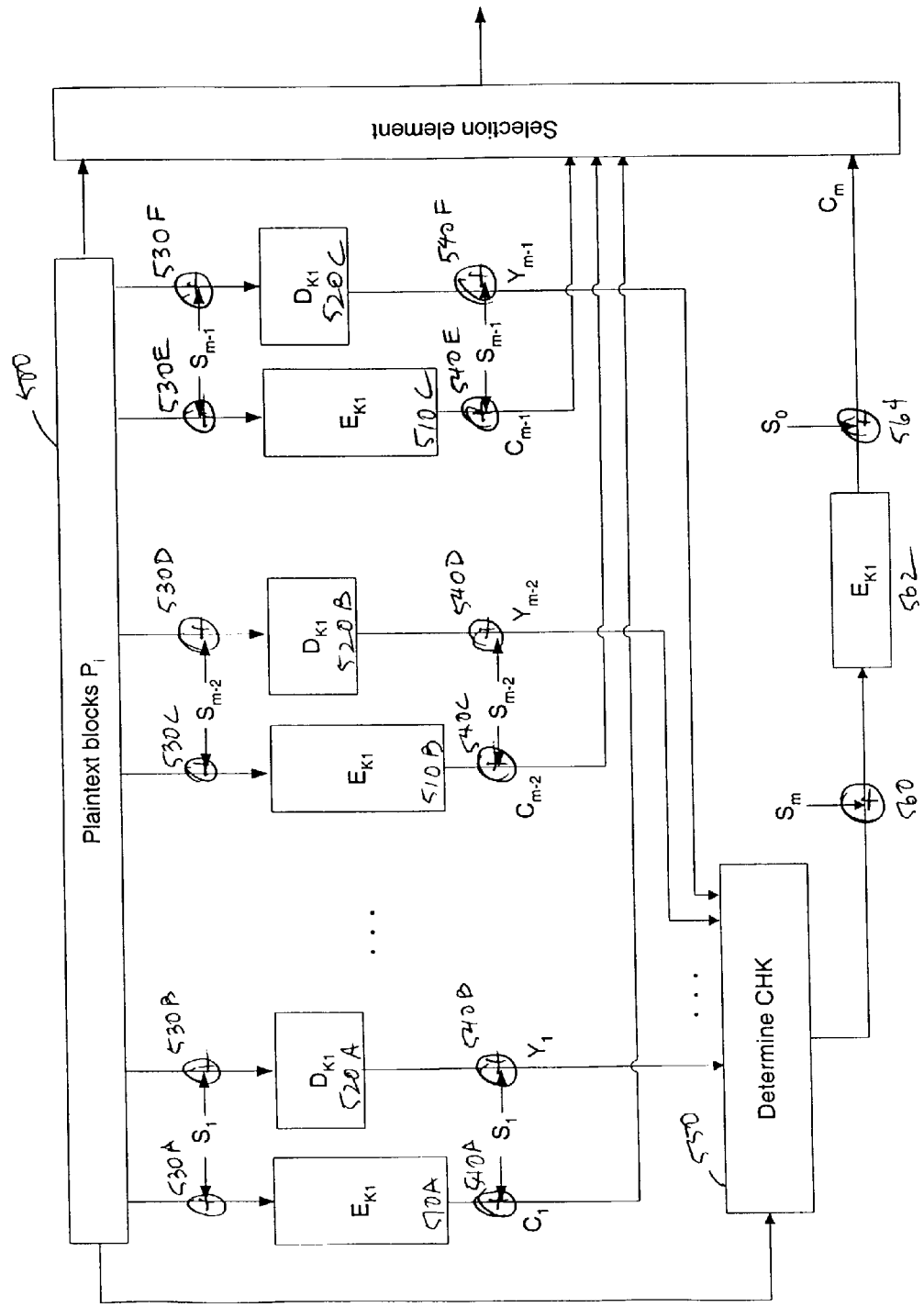
FIG. 5 is a block diagram of an apparatus for performing the encryption and authentication of the PEMI mode.

FIG. 5 is a block diagram of hardware that is configured to perform the above encryption and authentication functions of the PEMI mode in a parallel manner. It should be noted that FIG. 5 illustrates an implementation that can be an alternative to a software implementation, wherein a processor and memory is configured to execute a set of instructions for performing the above PEMI mode. Moreover, FIG. 5 illustrates a parallel implementation of the embodiment, which result in a faster encryption and authentication procedure.

Memory element 500 stores plaintext blocks $P_i$, some of which are to be encrypted for transmission and all of which are to be authenticated. Encryption elements 510A, 510B, and 510C are configured to perform a first cryptographic function upon inputs. Decryption elements 520A, 520B, and 520C are configured to perform a second cryptographic function upon inputs, wherein the second cryptographic function is the reverse of the first cryptographic function. For illustrative purposes only, three (3) encryption elements and three (3) decryption elements are shown in FIG. 5, but one of skill in the art knows that more or less encryption elements can be implemented without affecting the scope of the embodiment.

Combining elements 530A, 530B, 530C, 530D, 530E, and 530F are for combining a plaintext block $P_i$ from the memory element 500 with a noise block $S_i$ for $1 \leq i \leq m-1$. The outputs of combining elements 530A, 530C, and 530E are input into encryption elements 510A, 510B, and 510C. The outputs of combining elements 530B, 530D, and 530F are input into decryption elements 520A, 520B, and 520C. The output of encryption elements 510A, 510B, and 510C are combined at combining elements 540A, 540C, and 540E with the same noise blocks as used above for the inputs to the encryption elements 510A, 510B, and 510C. The output of the combining elements 540A, 540C, and 540E are the ciphertext blocks $C_i$. The output of decryption elements 520A, 520B, and 520C are combined at combining elements 540B, 540D, and 540F with the same noise blocks as used above for the inputs to decryption elements 520A, 520B, and 520C. The output of the combining elements 540B, 540D, and 540F are the authentication blocks $Y_i$.

The authentication blocks $Y_i$ and at least one of the plaintext blocks from memory element 500 are input into a checksum generator 550 to determine a checksum CHK. The checksum CHK is combined by a noise block at combining element 560. The result is then encrypted by encryption element 562. The output of the encryption element 562 is then combined by another noise block at combining element 564 to form an authentication tag $C_m$.

The ciphertext blocks $C_0$ through $C_{m-1}$, the authentication tag $C_m$, and the plaintext blocks $P_i$ are input into a selection element 570, which determines whether the blocks that are to be transmitted are either ciphertext or plaintext. In other words, those $P_i$ where i∈U are transmitted, along with those $C_i$ for which i∉U and the authentication tag $C_m$.

Figure 6:
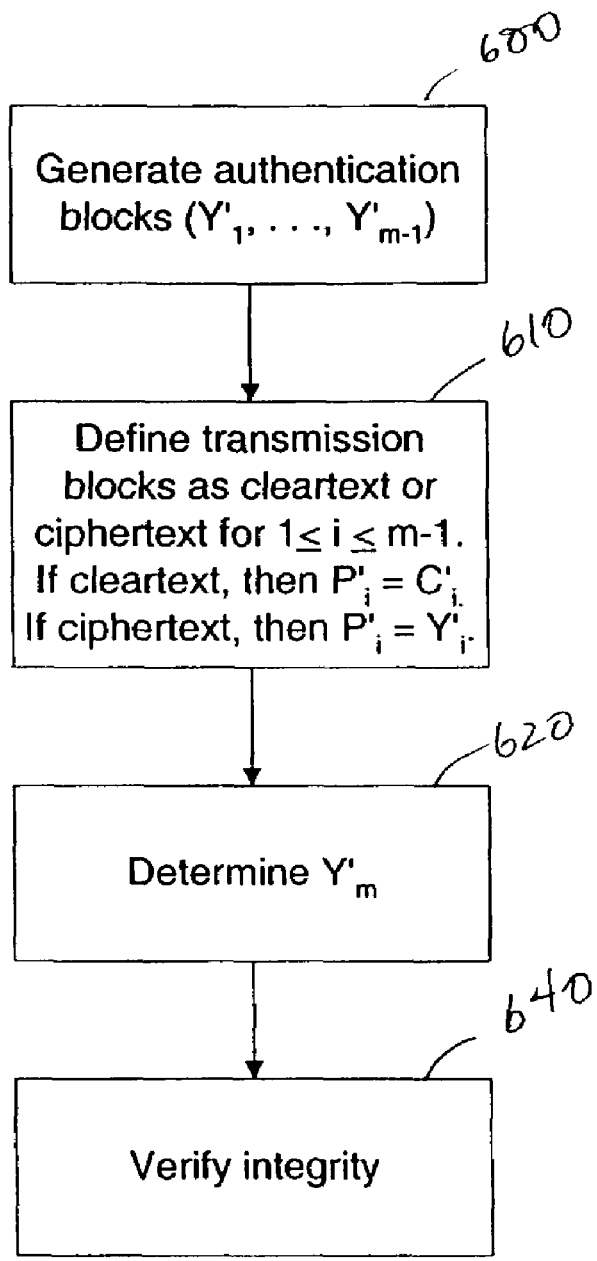
FIG. 6 is a block diagram of the decryption and verification process for the PEMI mode.

FIG. 6 is a block diagram of the decryption and verification of a message that has been encrypted and authenticated by PEMI. Suppose a receiver receives blocks $C'_0 \ldots C'_m$. Note that for i∈U, $C'_i$ was transmitted unencrypted. The receiver decrypts $C_0$ to obtain the nonce value r' and thereby derives the values of $S'_0$ through to $S'_m$. In alternate embodiments, the nonce value r' can be pre-stored or pre-negotiated between the sender and the receiver before the actual data transmission.

At step 600, the sender generates authentication blocks ($Y'_1, \ldots, Y'_{m-1}$) from ciphertext blocks ($C'_1, \ldots, C'_{m-1}$) according to the relations:

$$N'_i = C'_i \oplus S'_i,$$

$$M'_i = D_{K1}(N'_i),$$

$$Y'_i = S'_i \oplus M'_i.$$

At step 610, the data blocks are defined, for $1 \leq i \leq m-1$, according to the following relations:

If i∈U, then $P'_i = C'$;

If i∉U then $P'_i = Y'_i$.

At step 620, the MAC tag $C'_m$ is decrypted to determine checksum $Y'_m$ using the following relationships:

$$N'_m = C'_m \oplus S'_m,$$

$$M'_m = D_{K1}(N'_m),$$

$$Y'_m = S'_0 \oplus M'_m.$$

The receiver has now decrypted the ciphertext and the checksum, but the receiver needs to verify the integrity at step 640. To verify the integrity, the receiver confirms that the checksum $Y'_m$ is equal to the value of $(Y'_1 \oplus Y'_2 \oplus \ldots \oplus Y'_{m-1})$. If the message integrity is verified, then the message is $P_1, \ldots, P_{m-1}$.

Note that the sender can still apply the method used in OCB when the last data block that is of length less than n. The ciphertext block $C_{m-1}$ is formed in the same way, and the authentication block $Y_{m-1}$ is defined as:

$$Y_{m-1} = P^*_{m-1} = (0^* \| C_{m-1}) \oplus B_{m-1}.$$

If the last transmission block is in a cleartext position, then the ciphertext block is reset to the value of last data block. If the last data block is not in a cleartext position, then the ciphertext block remains as defined above.

The PEMI mode allows a sender to transmit part of a message as plaintext, but still authenticate the plaintext. Moreover, the PEMI mode follows the decryption steps that are used in IAPM, so that a receiver need not be re-configured to perform the PEMI decryption.

In the PEMI mode, the encryption and authentication functions are secure if the underlying block cipher is secure. There are formal expressions in the art for what is meant by the phrase "the encryption and authentication functions are secure," however these formal expressions are not relevant to the subject matter of the instant invention and will not be discussed herein. One skilled in the art will be familiar with the meaning of the phrase "the encryption and authentication functions are secure."

While the embodiments herein have been described with respect to a PEMI mode based on the AES block cipher, these embodiments can also be applied using other block ciphers. Note that the sender can choose to send either $P_i$ or $C_i$, and the authentication will not be compromised. Hence, the embodiments described herein allow a party to transmit both encrypted and unencrypted blocks without compromising the security of the authentication scheme. If $P_i$ is sent as plaintext, then the encrypted version of $P_i$ is still secret and unpredictable and can be used for secure authentication.

It is common practice to define the MAC as only a portion of the final block when using an authentication mode. The present embodiments may also be altered such that only a portion of the final block is transmitted as the MAC.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for encrypting and authenticating data as a single entity, comprising:
    forming a plurality of plaintext blocks from the data;
    specifying at least one cleartext position;
    determining a plurality of noise blocks using a nonce value;
    determining a first plurality of ciphertext blocks and a first plurality of authentication blocks associated with the at least one cleartext position, wherein each of the first plurality of ciphertext blocks is formed by setting a corresponding ciphertext block equal to a corresponding one of the first plurality of plaintext blocks, and each of the first plurality of authentication blocks is formed by:

combining a plaintext block with a corresponding noise block to form a corresponding intermediate ciphertext block;

decrypting the corresponding intermediate ciphertext block into a corresponding intermediate plaintext block; and combining the corresponding intermediate plaintext block with the corresponding noise block to form an authentication block;

determining a second plurality of ciphertext blocks and a second plurality of authentication blocks not associated with the at least one cleartext position, wherein each of the second plurality of authentication blocks is equal to a corresponding plaintext block, and each of the second plurality of ciphertext blocks is formed by:

combining a plaintext block with a corresponding noise block to form a corresponding intermediate plaintext block;

encrypting the corresponding intermediate plaintext block into a corresponding intermediate ciphertext block;

combining the corresponding intermediate ciphertext block with the corresponding noise block to form a ciphertext block;

computing a checksum value based on the first plurality of authentication blocks and second plurality of authentication blocks;

computing an authentication tag by combining the checksum value with a noise block, encrypting the combined checksum value and combining the encrypted checksum value with another noise block; and appending the authentication tag to a plurality of transmission blocks, wherein the transmission blocks comprise the first plurality of ciphertext blocks and the second plurality of ciphertext blocks.

2. The method of claim 1, wherein if the last plaintext block is sized less than the given block cipher size, then transforming the last plaintext block into an authentication block of length equal to the given block cipher size and a ciphertext block of length equal to the given block cipher size.

3. The method of claim 1, wherein the encrypting uses block cipher encryption and the decrypting uses block cipher decryption.

4. The method of claim 1, wherein the encrypting using block cipher decryption and the decrypting uses block cipher encryption.

5. The method of claim 1, wherein combining is performed using a bit-wise exclusive-or operation.

6. The method of claim 1, wherein combining is performed using a group operator.

7. The method of claim 6, wherein the group operator is a modular integer addition operator.

8. The method of claim 1, wherein the nonce value is a predetermined value.

9. The method of claim 1, wherein the nonce value is set equal to the first ciphertext block.

10. A method for decrypting and verifying a plurality of transmission blocks accompanied by an authentication tag, comprising:

determining a plurality of noise blocks using a nonce value and a first key;

determining a plurality of authentication blocks by:

combining a corresponding transmission block with a corresponding noise block to form a corresponding intermediate ciphertext block;

decrypting the corresponding intermediate ciphertext block into a corresponding intermediate plaintext block using a second key; and combining a corresponding intermediate plaintext block with the corresponding noise block to form a corresponding authentication block;

determining a first plurality of plaintext blocks corresponding to at least one cleartext position, wherein each of the first plurality of plaintext blocks is set equal to a corresponding transmission block;

determining a second plurality of plaintext blocks, wherein each of the second plurality of plaintext blocks do not correspond to the at least one cleartext position and is set equal to a corresponding authentication block;

computing a checksum value based on the plurality of authentication blocks; and verifying the authentication tag.

11. The method of claim 10, wherein if the last transmission block is sized less than the given block size, then:

transforming the last transmission block into an authentication block of length equal to the given block cipher size and a plaintext block of length equal to the last ciphertext block.

12. The method of claim 10, wherein verifying the authentication tag comprises:

combining the checksum with a noise block to form a noisy checksum;

encrypting the noisy checksum;

combining the encrypted noisy checksum with another noise block to form a test authentication tag; and comparing the test authentication tag with the authentication tag, wherein the authentication tag is verified if the test authentication tag and authentication tag are the same.

13. The method of claim 10, wherein verifying the authentication tag comprises:

combining the authentication tag with a noise block to form a noisy authentication tag;

decrypting the noisy authentication tag;

combining the decrypted noisy authentication tag with another noise block to form a test checksum value; and comparing the test checksum value with the checksum value, wherein the authentication tag is verified if the test checksum value and the checksum value are the same.

14. Apparatus for encrypting and authenticating data as a single entity, comprising:

at least one memory element; and at least one processing element configured to execute a set of instructions stored on the at least one memory element, the set of instructions for:

forming a plurality of plaintext blocks from the data;

specifying at least one cleartext position;

determining a plurality of noise blocks using a nonce value;

determining a first plurality of ciphertext blocks and a first plurality of authentication blocks associated with the at least one cleartext position, wherein each of the first plurality of ciphertext blocks is formed by setting a corresponding ciphertext block equal to a corresponding one of the first plurality of plaintext blocks, and each of the first plurality of authentication blocks is formed by:

combining a plaintext block with a corresponding noise block to form a corresponding intermediate ciphertext block;

decrypting the corresponding intermediate ciphertext block into a corresponding intermediate plaintext block; and combining the corresponding intermediate plaintext block with the corresponding noise block to form an authentication block;

determining a second plurality of ciphertext blocks and a second plurality of authentication blocks not associated with the at least one cleartext position, wherein each of the second plurality of authentication blocks is equal to a corresponding plaintext block, and each of the second plurality of ciphertext blocks is formed by:

combining a plaintext block with a corresponding noise block to form a corresponding intermediate plaintext block;

encrypting the corresponding intermediate plaintext block into a corresponding intermediate ciphertext block;

combining the corresponding intermediate ciphertext block with the corresponding noise block to form a ciphertext block;

computing a checksum value based on the first plurality of authentication blocks and second plurality of authentication blocks;

computing an authentication tag by combining the checksum value with a noise block, encrypting the combined checksum value and combining the encrypted checksum value with another noise block; and appending the authentication tag to a plurality of transmission blocks, wherein the transmission blocks comprise the first plurality of ciphertext blocks and the second plurality of ciphertext blocks.

15. Apparatus for decrypting and verifying a plurality of transmission blocks accompanied by an authentication tag, comprising:

at least one memory element; and at least one processing element configured to execute a set of instructions stored on the at least one memory element, the set of instructions for:

determining a plurality of noise blocks using a nonce value and a first key;

determining a plurality of authentication blocks by:

combining a corresponding transmission block with a corresponding noise block to form a corresponding intermediate ciphertext block;

decrypting the corresponding intermediate ciphertext block into a corresponding intermediate plaintext block using a second key, and combining a corresponding intermediate plaintext block with the corresponding noise block to form a corresponding authentication block;

determining a first plurality of plaintext blocks corresponding to at least one cleartext position, wherein each of the first plurality of plaintext blocks is set equal to a corresponding transmission block;

determining a second plurality of plaintext blocks, wherein each of the second plurality of plaintext blocks do not correspond to the at least one cleartext position and is set equal to a corresponding authentication block;

computing a checksum value based on the plurality of authentication blocks; and verifying the authentication tag.

16. Apparatus for encrypting and authenticating data as a single entity, comprising:

means for forming a plurality of plaintext blocks from the data;

means for specifying at least one cleartext position;

means for determining a plurality of noise blocks using a nonce value;

means for determining a first plurality of ciphertext blocks and a first plurality of authentication blocks associated with the at least one cleartext position, wherein each of the first plurality of ciphertext blocks is formed by setting a corresponding ciphertext block equal to a corresponding one of the first plurality of plaintext blocks, and each of the first plurality of authentication blocks is formed by:

combining a plaintext block with a corresponding noise block to form a corresponding intermediate ciphertext block;

decrypting the corresponding intermediate ciphertext block into a corresponding intermediate plaintext block; and combining the corresponding intermediate plaintext block with the corresponding noise block to form an authentication block;

means for determining a second plurality of ciphertext blocks and a second plurality of authentication blocks not associated with the at least one cleartext position, wherein each of the second plurality of authentication blocks is equal to a corresponding plaintext block, and each of the second plurality of ciphertext blocks is formed by:

combining a plaintext block with a corresponding noise block to form a corresponding intermediate plaintext block;

encrypting the corresponding intermediate plaintext block into a corresponding intermediate ciphertext block;

combining the corresponding intermediate ciphertext block with the corresponding noise block to form a ciphertext block;

means for computing a checksum value based on the first plurality of authentication blocks and second plurality of authentication blocks;

means for computing an authentication tag by combining the checksum value with a noise block, encrypting the combined checksum value and combining the encrypted checksum value with another noise block; and means for appending the authentication tag to a plurality of transmission blocks, wherein the transmission blocks comprise the first plurality of ciphertext blocks and the second plurality of ciphertext blocks.

17. Apparatus for decrypting and verifying a plurality of transmission blocks accompanied by an authentication tag, comprising:

means for determining a plurality of noise blocks using a nonce value and a first key;

means for determining a plurality of authentication blocks by:

combining a corresponding transmission block with a corresponding noise block to form a corresponding intermediate ciphertext block;

decrypting the corresponding intermediate ciphertext block into a corresponding intermediate plaintext block using a second key; and combining a corresponding intermediate plaintext block with the corresponding noise block to form a corresponding authentication block;

means for determining a first plurality of plaintext blocks corresponding to at least one cleartext position, wherein each of the first plurality of plaintext blocks is set equal to a corresponding transmission block;

means for determining a second plurality of plaintext blocks, wherein each of the second plurality of plaintext blocks do not correspond to the at least one cleartext position and is set equal to a corresponding authentication block;

means for computing a checksum value based on the plurality of authentication blocks; and means for verifying the authentication tag.

* * * * *